United States Patent [19]

Koga

[11] Patent Number: 4,656,511
[45] Date of Patent: Apr. 7, 1987

[54] VIDEO SIGNAL COMPRESSING AND CODING APPARATUS

[75] Inventor: Toshio Koga, Tokyo, Japan

[73] Assignee: NEC Corporation, Japan

[21] Appl. No.: 656,147

[22] Filed: Sep. 28, 1984

[30] Foreign Application Priority Data

Sep. 30, 1983 [JP] Japan .............................. 58-183441

[51] Int. Cl.$^4$ .............................................. H04N 7/12
[52] U.S. Cl. ..................................... 358/136; 358/105; 358/133
[58] Field of Search ............... 358/105, 133, 135, 136, 358/137, 260, 140, 180

[56] References Cited

U.S. PATENT DOCUMENTS

| | | | |
|---|---|---|---|
| 4,240,113 | 12/1980 | Michael et al. ................. | 358/105 X |
| 4,307,420 | 12/1981 | Ninomiya et al. .................. | 358/136 |
| 4,346,405 | 8/1982 | Yoda et al. .......................... | 358/105 |
| 4,371,895 | 2/1983 | Koga ................................ | 358/105 X |
| 4,546,386 | 10/1985 | Matsumoto et al. ........... | 358/105 X |

Primary Examiner—Howard W. Britton
Assistant Examiner—Victor R. Kostak
Attorney, Agent, or Firm—Ostrolenk, Faber, Gerb & Soffen

[57] ABSTRACT

A video signal compression circuit for encoding a video signal to reduce the quantity of video information that is transmitted without loss of information, and a video signal decompressing circuit for recovering the video signal from its compressed coded form. The encoding circuit includes means for dividing the video signal of each television frame into blocks, each block including a plurality of picture elements distributed over several scan lines. The information in each block is analyzed to detect image movement in that block and a movement detection signal corresponding to each block is produced. Thereafter, the movement detection signal is rearranged to have a time sequence which corresponds to the sequential order of the picture elements in the original video signal. With the help of the rearranged movement detection signal, the original video signal is coded in accordance with a predictive-coding scheme into a form which allows it to be transmitted over a television signal carrier. In alternate embodiments, the movement detection signal remains in a time sequence which corresponds to its block form and instead the video signal is converted to have a time sequence which corresponds to the time sequence of the movement detection signal.

8 Claims, 8 Drawing Figures

VIDEO SIGNAL COMPRESSING AND CODING APPARATUS

BACKGROUND OF THE INVENTION

The present invention relates to a compressing and coding apparatus for a video signal.

As a method for coding a video signal, a interframe coding method, for example, is well known. With this method, good efficiency is available, i.e., a high compression ratio and good picture quality, when a video signal to be coded is relatively stationary. However, the interframe coding method is disadvantageous in that the coding efficiency is decreased when greater portions of the video signal represent large moving objects or a quick or sudden movement. In order to overcome these disadvantages, there has been proposed a movement-compensated predictive coding that is able to code the video signal corresponding to the moving portion with a high efficiency.

Such movement-compensated predictive coding is basically classified into two types. In one type, a movement in the input video signal to be coded is detected pixel-by-pixel by using each coded picture element. In the other type, the movement is detected block-by-block, each block comprising a plurality of picture elements. The movement-compensated predictive coding based on the block-by-block sub-division method is disclosed, for example, in U.S. Pat. No. 4,371,895. According to the disclosure of the above patent, the movement-compensated predictive coding is performed in such a manner that, an evaluation value is obtained by detecting similarities between a television signal in one movement detection block of a current frame and television signals in movement detection blocks of a previous frame. The detection is carried out as positions of the blocks of the previous frame are shifted by various amounts (referred to as trial vectors), and while the television signal in the movement detection block of the previous frame having the maximum degree of similarity is used for a prediction signal for the movement detection block of the current frame.

In a movement-compensated predictive coding apparatus based on the block-by-block method an input video signal is pre-scan converted in accordance with the arrangement of blocks, each of which is used for movement detection, such that the time sequence of the input video signal complies with that of the blocks. Such pre-scan conversion leads to an advantage that sequential processing for each picture element for coding matches sequential processing of the blocks for detecting the movement. That is, the data associated with each block is arranged in an order which facilitates the processing of the data.

However, the pre-scan converting of the input video signal at the beginning to detect the movement leads to the following disadvantage. To detect movement, it is required to compare a signal of some block with a signal having one frame time difference in a corresponding surrounding region. Simultaneously, it is also required to change the data (write) of a region of subsequent several lines in preparation for the next movement detection. At this time, if the number of lines permitting movement compensation is not an integer times the number of lines included in one block, this creates a memory area in which signal information written therein is not used for detecting movement. Consequently, that memory area becomes useless. In order to avoid the above disadvantage, the area for which movement compensation is provided must be set to a size of an integer times the size of one block. The foregoing disadvantage will be described later in greater detail.

SUMMARY OF THE INVENTION

Therefore, it is an object of the present invention to provide a video signal compressing and coding apparatus in which a useless memory area is not generated at the time of detecting a movement.

Another object of the present invention is to provide a video signal compressing and coding apparatus in which the size of a block used for detecting a movement and the size of a movement compensable range do not impose limiting constraints on the processing.

According to an aspect of the present invention, there is provided a video signal compressing and coding apparatus, comprising a movement detecting circuit for detecting a movement in an input video signal for each of movement detecting blocks designated on a television screen, a rearranging circuit for rearranging movement detection outputs delivered from the movement detecting circuit to comply with the time sequence of the input video signal, and a predictive-coding circuit for predictive-coding the input video signal into a prediction error compressed signal in response to the rearranged movement detection outputs delivered from the rearranging circuit.

According to a further aspect of the present invention, there is provided a video signal compressing and coding apparatus, comprising a movement detecting circuit for detecting a movement in an input video signal for each of several movement detecting blocks defined on a television screen, a scan-converting circuit for scan-converting the input video signal to a form which complies with the time sequence of the movement detection signal delivered from the movement detecting circuit, and a predictive-coding circuit for predictive-coding the scan-converted video signal into a prediction error compressed signal in response to the movement detection signal delivered from the movement detecting circuit.

BRIEF DESCRIPTION OF THE DRAWINGS

FIG. 6 is a block diagram showing the configuration of a movement detecting circuit that may be employed in the embodiment of FIGS. 3 and 5;

FIG. 7 is a block diagram showing the configuration of a moving vector rearranging circuit that may be employed in the embodiment of FIGS. 3 and 5; and FIG. 8 is a block diagram of a second embodiment of the present invention.

DESCRIPTION OF PRIOR ART

Figure 1:
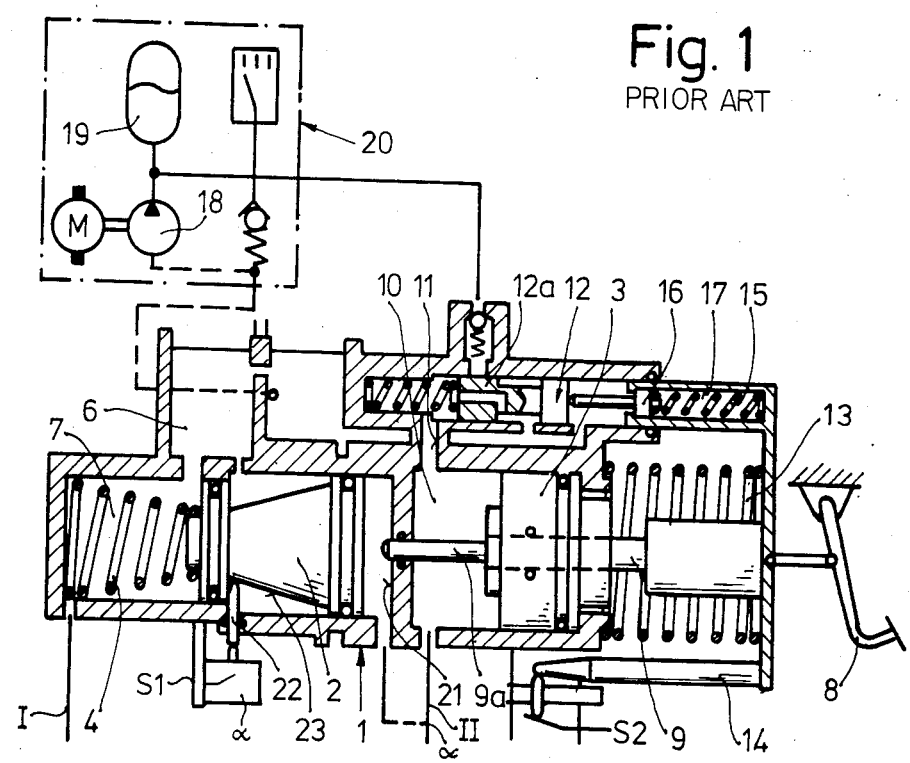
FIG. 1 is view showing picture elements in one movement detection block in a form which facilitates explanation of the invention.

First, the prior art will be briefly described so that the present invention may be better understood. An example of a conventional pre-scan conversion scheme is explained with reference to FIG. 1. In FIG. 1, a time sequence of picture elements in an input video signal in time, is shown. Time sequence A, i.e., $a_0, a_1, a_2, \ldots, a_7, a_8, \ldots, a_m, b_0, b_1, b_2, \ldots, b_7, b_8, \ldots, b_m, c_0, c_1, c_2, \ldots, c_7, c_8, \ldots, c_m, d_0, d_1, d_2, \ldots, d_7, d_8, \ldots, d_m, \ldots$ is converted to different a time sequence B of $a_0, a_1, a_2, \ldots, a_7, b_0, b_1, b_2, \ldots, b_7, c_0, c_1, c_2 \ldots, c_7, d_0, d_1, d_2, \ldots, d_7, a_8, a_9, \ldots a_{15}, b_8, b_9, \ldots b_{15}, c_8, c_9, \ldots, c_{15}, d_8, d_9, \ldots, d_{15}$. In this case, one scanning line comprises (m+1) picture elements and a block size for detecting the motion is composed of 4 lines × 8 picture elements. In this prior art system, once the input video signal has been subjected to scanning conversion, signal processing is completed in synchronism with the block sequence, even when the signal processing is sequentially performed on a pixel-by-pixel basis.

Figure 2:
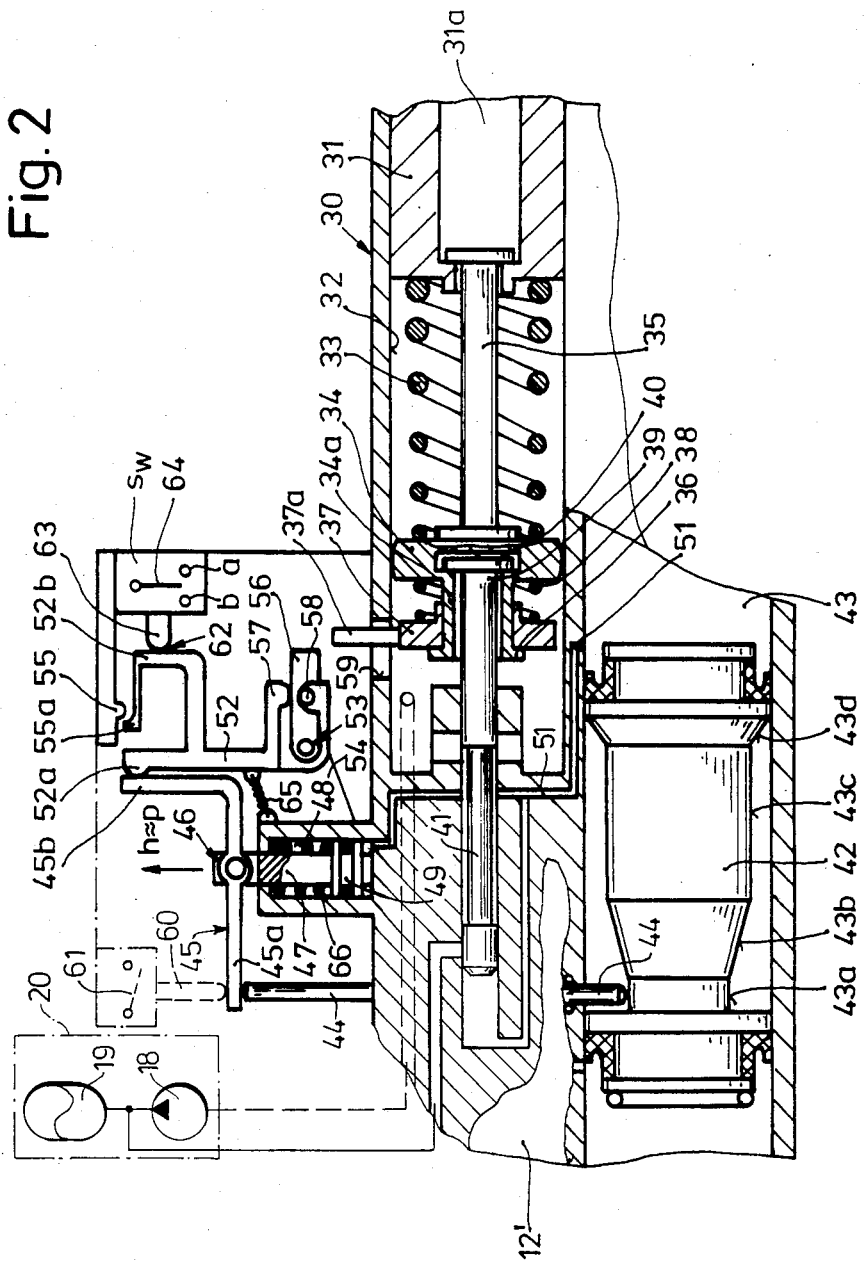
FIG. 2 is a view showing the relationship between blocks used for detecting a movement and a movement compensable region.

However, such pre-scan conversion may cause the following disadvantage. This disadvantage will be described with reference to FIG. 2. In FIG. 2, it is assumed that a size of one block used for detecting the movement is of N lines × M picture elements, and that a movement compensable range comprises ±V lines in the vertical direction and ±H picture elements in the horizontal direction from each side of a block. Also, regions, each comprising N lines, around a block A which is currently subjected to the movement detection are defined as regions 0–5 as illustrated.

When one block A in the region 2 is coded, for example, the movement compensable range lies across ±V lines from the side of the block A, namely, the regions 0, 1, 2, 3 and 4 with the condition that V>N. On the other hand, in order to detect the movement in the input video signal in real time, new N lines must be filled up into a memory for next movement detection; simultaneous with the movement detection of the current block. For example, when the block A (M picture elements × N lines) contained in the region 2 is subjected to movement detection, the video signal in the region 5 should be filled up under the condition of 2N22 V>N as shown in FIG. 2. In this case, however, a memory area corresponding to (2N−V) lines is out of the movement compensable range and is practically useless in each of the regions 0 and 4, because it is not used for the movement detection. This can not be avoided in the conventional technique in which the signal is filled up in block units.

When a block B in the region 3 is subjected to the movement detection, the movement compensable range lies across the regions 1 to 5 so that the region to be filled up becomes the region following the region 5. Since the region 0 is already free at this time, this region 0 may be used for filling the following region.

Furthermore, when the movement detection is made for a block C in the region 4, the movement compensable range lies across the regions 2, 3, 4, 5 and 0, so that the region 1 may be used for filling. As described above, the memory area corresponding to six regions in total, i.e., 6N lines, are necessary to implement the movement detection and filling-up, and 2×(2N−V) lines in the total lines are effectively of no use.

To save N lines in those 6N lines, it is possible, for example, to fill up the video signal into a partial memory area which is already not used for the movement detection in the region 0, while the block A in the region 2 is subject to the movement detection. More specifically, assuming now that the movement detection is being made for the block A at present and the detection range in the horizontal direction is of ±H picture elements, the region 5 can be eliminated by filling up the video signal into a special area of the region 0, which are spaced leftwards by H or more elements from the same position as the block A, so that the number of necessary regions becomes five, i.e., regions 0 to 4, namely, 5N lines. In this case, it is assumed that scanning is performed from the left to the right on the drawing. However, a useless memory area corresponding to 2×(2N−V) lines is still present even though such improvement is available, and address control for reading/writing becomes more complicated.

Such useless but nonetheless necessary memory area and complex address control are basically attributable to the fact that the video signal has been previously scan-converted in accordance with the sequence of the movement detection blocks. To eliminate such disadvantages, therefore, the vertical movement compensable region V must be set equal to N or integer times thereof.

DESCRIPTION OF THE PREFERRED EMBODIMENT

As mentioned above, the memory area corresponding to 2×(V−N) lines are of no use when filling-up is performed for each block comprising N lines × M picture elements. Here, if the filling-up is performed in the same time sequence as an original input video signal, the same filling-up operation can be applied both where the movement detection range lies across a plurality of regions and where the movement detection range does not lie across plural regions. In other words, since the scan conversion is not carried out, it is enough to fill up the video signal corresponding to one scanning line N times, and there is no problem even if the movement detection regions are designated in various manners. This is a great advantage resulting from filling up a movement detection section VD with the video signal which has not been subjected to scanning conversion.

Figure 3:
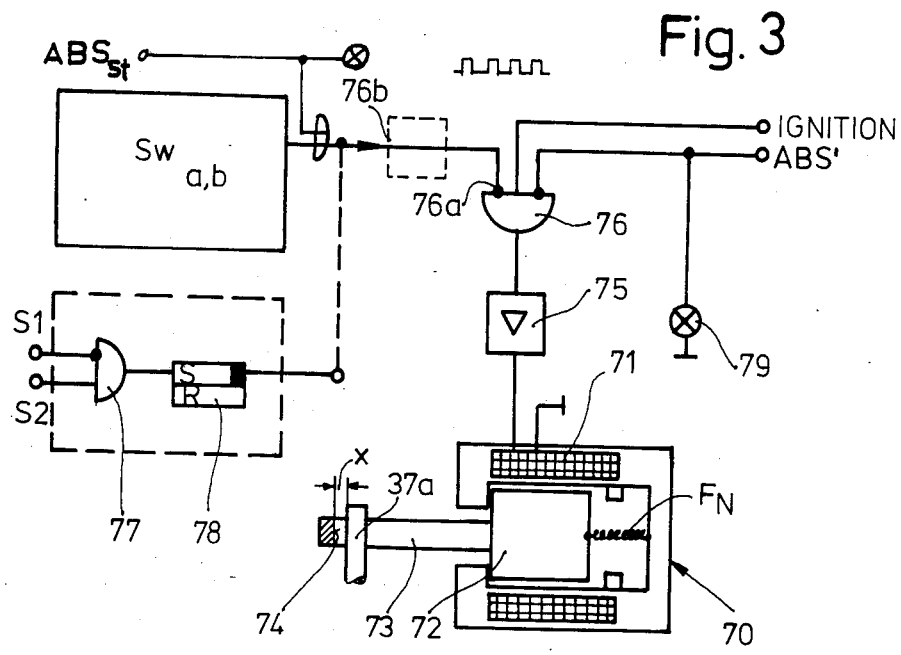
FIG. 3 is a block diagram of a first embodiment of the present invention.

Referring now to FIG. 3, wherein a first embodiment of the present invention is illustrated, movement information is obtained by a movement detecting section 1 which operates on a block-by-block basis on data from an input video signal. The movement information from the section 1 is rearranged by a rearranging section 2 into the same time sequence $T_a$ as that for the input video signal. Then, the input video signal is coded into a prediction error signal in response to the movement information from the rearranging section 2 by a movement-compensated predictive coding section 3. In an input section, a movement compensation predictive decoding section 4 decodes the prediction error signal transmitted through a transmission line into a decoded video signal. In this case, the decoded video signal from the section 4 has the same time sequence $T_a$ as that of the original input video signal.

The rearrangement of the movement information which constitutes a feature of the present invention will not be described. The rearrangement of the movement information is basically analogous to the scan conversion described in connection with FIG. 1. It will be assumed that the size of a movement detection block is 4 lines × 8 picture elements, as in the foregoing description.

Figure 4:
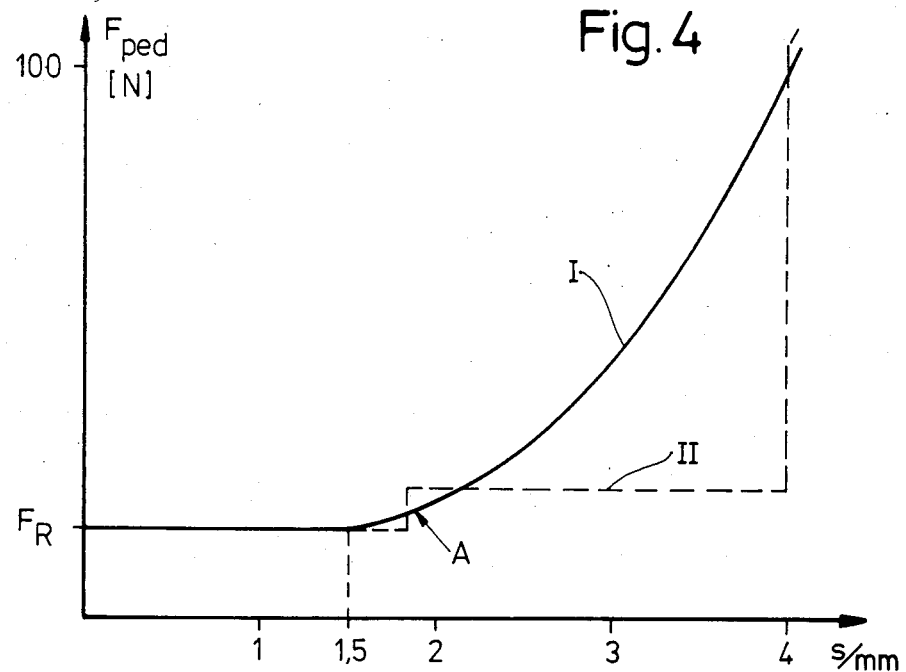
FIG. 4 is a view showing alignment of moving vectors in the horizontal direction.

The movement detecting section 1 detects the movement in each block and outputs the movement information $V_0$ to $V_m$ corresponding to $(m+1)$ blocks as shown in FIG. 4. In the rearranging section 2, the movement information connected to the first scanning line i in the respective blocks is read out continuously while the coding proceeds in correspondence to the scanning line i in the coding section 3. Subsequently, respective movement information is read out for following scanning lines $(i+1)$, $(i+2)$ and $(i+3)$ in the same manner. For example, as for the scanning line i, the movement information $V_0$ is first read out continuously for a time period corresponding to eight picture elements and then the movement information $V_1, V_2, \ldots, V_g, \ldots, V_{m-1}, V_m$ is sequentially read out each for a time period of eight picture elements. As for the next scanning line $(i+1)$, the movement information $V_0, V_1, V_2, \ldots, V_g, \ldots, V_{m-1}, V_m$ is sequentially read out each for the time period of eight picture elements. As for the scanning lines $(i+2)$ and $(i+3)$, the same reading operation is also processed. In addition, as for scanning lines subsequent to the scanning line $(i+3)$, the similar rearrangement as for the scanning lines i to $(i+3)$ is performed.

According to the present invention, the block size and the movement compensation range in the vertical direction can be independently selected without limitations, thus making it possible to simplify the hardware and process of the apparatus. Further, predictive coding/decoding can be implemented without performance of the scan conversion because the movement information detected in block units is generated in the same time sequence as the input video signal.

Figure 5:
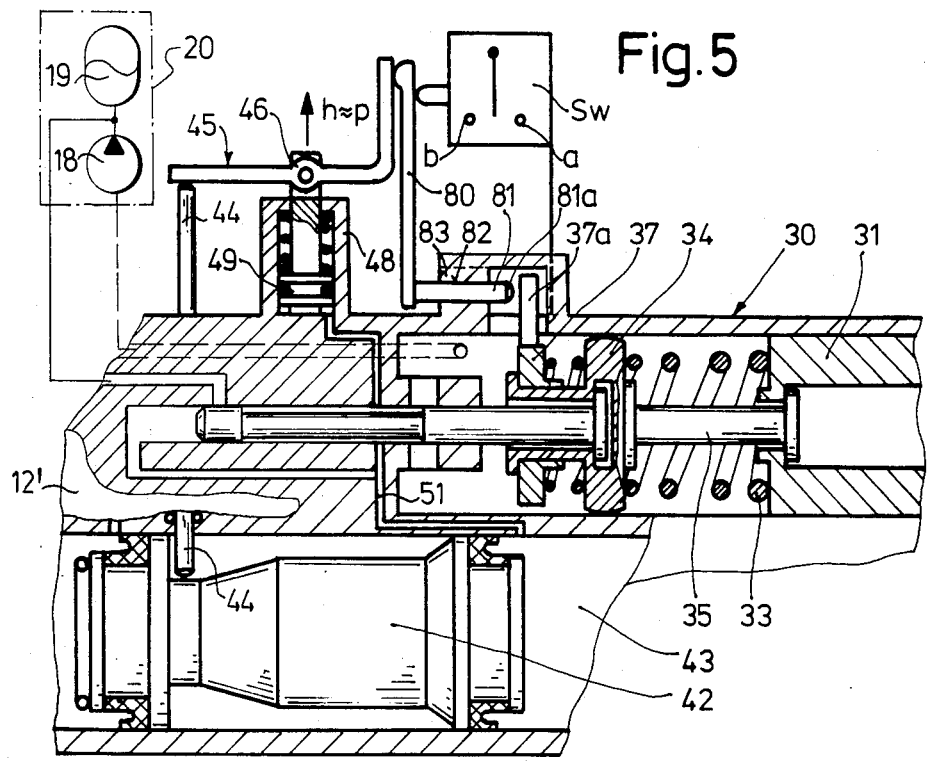
FIG. 5 is a block diagram showing the embodiment of FIG. 3 in greater detail.

The present invention will be described below in more detail with reference to the drawings. FIG. 5 shows a detailed block diagram of a coding/decoding apparatus in accordance with one embodiment of the present invention. In the transmitting end 3 (coding apparatus), an input video signal is supplied through line $l_1$ to a delay circuit 30 and a movement detecting circuit 1. In the movement detection circuit 1, a movement is detected on a block-by-block basis. The movement detection circuit 1 will be described later in detail. Movement information for each block detected in the circuit 1 is supplied to a rearranging circuit 2 where the time sequence of the movement information is rearranged into the same time sequence $T_a$ as the input video signal supplied through the line $l_1$.

Thereafter, the rearranged movement information is supplied to a variable delay circuit 31 and a code compressing circuit 32 via a line $l_2$. The variable delay circuit 31 controls a delay time of a video signal supplied from a frame memory 33 in accordance with the rearranged movement information so as to generate a prediction signal in which the movement compensation is provided.

The prediction signal from the circuit 31 is supplied to a subtractor 34 and an adder 35 through a line $l_3$. The subtractor 34 calculates a difference between the output video signal from the variable delay circuit 31 and the video signal delivered from the delay circuit 30. During the delay produced by the delay circuit 30, the movement detection is performed. The difference, i.e., prediction error is delivered from the subtractor 34 and supplied to a quantization circuit 36. The quantization circuit 36 quantizes the prediction error and the quantized prediction error is supplied to the adder 35 and the code compressing circuit 32 through a line $l_4$. The adder 35 generates a local decoded signal (video signal) by adding the quantized prediction error and the prediction signal supplied through the line $l_3$. The local decoded signal is supplied to a frame memory 33 having about one frame delay time. It is to be noted that, when the movement information indicates no motion, i.e., a stationary image, the sum of delay times of the frame memory 33 and the variable delay circuit 31 becomes just one frame period. In this case, delay times of the subtractor 34, the quantization circuit 36 and the adder 35 are neglected.

In the code compressing circuit 32, the quantized prediction error supplied through the line $l_4$ and the movement information are both coded by variable word-length coding, for example, Huffman coding. In the circuit 32, synchronizing and control information is also coded and multiplexed. The video signal thus compressed and coded is fed to a transmission line $l_5$ through a buffer memory 37 where the transmission speed is determined by bandwidth, i.e. the transmission speed of the line $l_5$. It is to be noted that a magnetic or optical recording medium may be used in place of the transmission line $l_5$. The description will be continued on an assumption that the signal is passed through the transmission line $l_5$.

At the receiving end (decoding apparatus) 4, the compressed video signal transmitted through the transmission line $l_5$ is first stored in a buffer memory 40 for speed conversion, and then supplied to a code extending circuit 41. The code extending circuit 41 reproduces the movement information, quantized prediction error, synchronizing and control information by reversing the process performed in the code compressing circuit 32 of the transmitter 3.

The reproduced prediction error is supplied to an adder 42 through a line $l_6$ and the reproduced movement information is supplied to a variable delay circuit 43 through a line $l_7$, respectively. The variable delay circuit 43 produces a variable delay time in the video signal delivered from a frame memory 44 in accordance with the reproduced movement information so as to generate the prediction signal. The prediction signal is then applied to the adder 42. The variable delay circuit 43 can be implemented and is similar to the variable delay circuit 31 in the transmitter 3.

The adder 42 produces a video signal by adding the prediction signal from the circuit 43 and the reproduced prediction error supplied through the line $l_6$. The thus reproduced video signal is supplied to the output of the receiver 4 but is also supplied to the frame memory 44 through $l_8$. As in the transmitter 3 (coding apparatus), when the video signal includes no moving picture elements, the sum of delay times of the frame memory 44 and the variable delay circuit 43 becomes one frame period assuming no delay occurs through the adder 42.

The movement detecting circuit 1 will now be described in detail with reference to FIG. 6. The input video signal supplied through the line $l_1$ is transmitted to a frame memory 10 and to a block memory 11, which scan-converts the time sequence $T_a$ of the video signal to a time sequence $T_b$. A movement-detecting control circuit 12 continuously outputs trial vectors through a line $l_9$, which are supplied to an address converting circuit 18 and an optimum vector determining circuit 14.

The address converting circuit 18 generates a memory address corresponding to the position of a block spatially displaced by each of the supplied trial vectors, which address is supplied to a programmable delay circuit 14'. If the trial vector is equal to zero, the sum of delay times caused by the frame memory 10 and the programmable delay circuit 14 becomes just one frame period.

The video signal in the block, which is spatially displaced by the supplied trial vector, is supplied to a subtractor 15 through a line $l_{10}$, wherein the displaced video signal is subtracted from the video signal delivered to the subtractor is from the block memory 11 through a line $l_{11}$. The block memory 11 has two memory areas each corresponding to N lines. In the block memory 11, while the input video signal supplied through the line $l_1$ is written into one memory area in accordance with the time sequence $T_a$, the stored video signal is read out from the other memory area in accordance with the time sequence $T_b$ so as to output it through the line $l_{11}$. Also, reading and writing operations in the block memory 11 are switched over alternately for each N lines.

The subtraction result from the subtractor is is supplied to an accumulating adder 16. In the accumulating adder 16, an accumulated value (an evaluation value) for each block with respect to one arbitrary trial vector is produced. The accumulated value is supplied to a comparator 17. The comparator 17 sequentially compares the accumulated values with one another, which values correspond to the respective trial vectors delivered from the move-detecting control circuit 12. Based thereon, the comparator 17 finds the smallest accumulated value and generates a selection signal corresponding to the trial vector which produces the smallest accumulated result.

The optimum vector determining circuit 14 temporarily stores the trial vector designated by the selection signal, and then outputs this trial vector as the detected result (the movement information) at a given timing for each block. This output, i.e., the movement information is supplied to the rearranging circuit 2 in FIG. 5.

The programmable delay circuit 14' will now be described. It is assumed that the programmable delay circuit 14' includes a memory having the capacity to store the video signal in the movement compensation range as shown in FIG. 2, for example. In FIG. 6, the delayed video signal delivered from the frame memory 10 is supplied to the programmable delay circuit 14'as a filling-up video signal in accordance with the time sequence $T_a$, i.e., the raster scanning sequence. For example, while the hatched block A (M picture elements×N lines) in FIG. 2 is read out in connection with the processing relative to a trial vector, a total of N lines in the region 4 is sequentially filled up for each scanning line toward the bottom. At the time when the movement information has been detected for the block in the region 2, the filling-up operation into N lines in the region 4 is completed. Therefore, the writing operation into the programmable delay circuit 14' is performed in accordance with the raster scanning sequence, whereas the reading operation therefrom is performed on the block-by-block basis, i.e., in accordance with the time sequence $T_b$.

When it is difficult to compute the movement information in real time because of operating speed limitations of the circuit elements, a desired high-speed operation can be achieved by a modification that allows the programmable delay circuit 14' and the block memory 11 to perform their respective output operations in parallel, and simultaneously to ensure that the subtractor 15 and the accumulating adder 16 are capable of performing their inputting functions in parallel.

In this embodiment, it is not necessary to perform the coding of the movement information for each picture element. Because, the size of block is of 4 lines×8 picture elements as above, each movement information always continues for eight picture elements in the scanning direction and the set of the same information is repeated for four scanning lines.

The rearranging circuit 2 will now be described with reference to FIG. 7. The circuit 2 rearranges the movement detection information (moving vector) based on the block-by-block sent from the movement detecting circuit 1 into the movement detection information based on each picture element (pixel-by-pixel). The rearranging circuit 2 includes a pair of vector memories 20 and 21, selectors 22 and 23 positioned at the input and output of these vector memories, respectively, an address counter 24 for updating addresses in accordance with the block sequence, an address counter 25 for updating addresses in accordance with the picture element sequence, an address converter 26 for restraining changes of the picture element addresses in accordance with the number of picture elements included in one block, and a switch 27 for alternately sending one address type or the other to the vector memories 20 and 21.

Each of the vector memories 20 and 21 has a capacity capable of storing the moving vectors $V_0, V_1, \ldots, V_m$ shown in FIG. 4. Moving vectors detected in blocks aligned in the horizontal direction are written into one memory. Next, the movement detection is performed on aligned blocks low subsequent in the vertical direction and the detected moving vectors are written into the other memory. At the same time, the one memory is subjected to reading operation, so that the moving vectors are delivered in a picture element format in accordance with the time sequence of the input video signal. Of course, the moving vector remains unchanged through all picture elements in one block in the horizontal direction.

Referring now to FIG. 8 showing a second embodiment of the present invention, a movement detecting circuit 1 performs movement detection of an input video signal as the same as the embodiment of FIG. 3 and, then, outputs the detected information in the time sequence $T_b$ to a movement compensated predictive coding section 3. In FIG. 8, the input video signal is converted into a form of a time sequence $T_b$ by a scan conversion circuit 5, instead of rearranging the movement information from the movement detecting circuit 1. Accordingly, coding is performed in accordance with the time sequence $T_b$ in the coding section 3. Therefore, after being decoded by a decoding section 4, a reproduced video signal should be converted to a video signal in the time sequence $T_a$ by a scan inverse-conversion circuit 6.

According to the present invention, as described above, movement compensated coding having a very high coding efficiency and adapted to detect a movement on block-by-block bases can be realized in accordance with the raster scanning sequence similar to that for a normal TV signal. Furthermore, in the present invention, filling-up of the video signal into the movement detecting circuit 1 is not limited by the size of the movement detection block. Consequently, the present invention produces significant practical advantages.

What is claimed is:

1. A video signal coding apparatus comprising:

means responsive to an input signal for detecting a movement in each of several blocks associated with said video signal to produce a movement detection signal representative of said movement, each said block including a plurality of picture elements which span across several scanning lines;

means for rearranging said movement detection signal into a rearranged movement detection signal which complies with the time sequence of the picture elements of said input video signal; and means for predictive-coding said input video signal in response to said rearranged movement detection signal.

2. A video signal coding apparatus as claimed in claim 1, wherein said rearranging means includes:

means for generating a write-in address signal in accordance with a time sequence of said movement detection signal;

means responsive to said write-in address signal for storing said movement detection signal; and means for generating a read-out address signal for reading out said movement detection signal from said storing means, said read-out address signal being generated in accordance with the time sequence of said input video signal.

3. A video signal coding apparatus comprising:

means responsive to an input video signal for detecting a movement in each of several blocks associated with said video signal to produce a movement detection signal representative of said movement, each said block including a plurality of picture elements which span across several scanning lines;

means for rearranging said movement detection signal to comply with a time sequence of the picture elements of said input video signal;

means for producing a prediction signal in response to said rearranged movement detection signal;

means for extracting a difference between said input video signal and said prediction signal to produce a prediction error signal; and means for compression-coding said prediction error signal.

4. A video signal coding apparatus as claimed in claim 3, wherein said rearranging means includes:

means for generating a write-in address signal in accordance with a time sequence of said movement detection signal;

means for generating a read-out address signal in accordance with a time sequence of said input video signal; and two sets of memories for alternately storing said movement detection signal in response to said write-in address signal and reading out the stored movement detection signal in response to said read-out address signal to deliver said rearranged movement detection signal.

5. A video signal decoding apparatus for receiving a compression-coded prediction error signal and a motion detection signal, said signals having respective time sequence formats of a television raster scan format, said apparatus comprising:

means for decompressing said compression-coded prediction error signal to produce a prediction error signal;

means for producing a prediction signal in response to said motion detection signal; and means for decoding a video signal in accordance with said prediction error signal and said prediction signal.

6. A video signal coding apparatus comprising:

means for organizing the information inherent in a raster scan type video signal into blocks, each said block including a plurality of picture elements distributed over a plurality of scan lines;

means for detecting image movement in each said block and for producing a movement detection signal corresponding to each said block and indicative of image movement therein;

means for rearranging said movement detection signal in a rearranged sequence which corresponds to the order of picture elements in said video signal; and means for coding said video input video signal in accordance with a predictive-coding scheme which uses said rearranged movement detection signal.

7. A video signal coding apparatus as claimed in claim 6, wherein said rearranging means includes:

means for generating a write-in address signal in accordance with a time sequence of said blocks;

means responsive to said write-in address signal for storing said movement detection signal; and means for generating a read-out address signal for reading out said rearranged movement detection signal from said storing means.

8. A video signal coding apparatus comprising:

means for organizing the information inherent in a raster scan type video signal into blocks, each said block including a plurality of picture elements distributed over a plurality of scan lines;

means for detecting image movement in each said block and for producing a movement detection signal corresponding to each said block and indicative of image movement therein;

means for rearranging a time sequence associated with said movement detection signal to a time sequence form which corresponds to a time sequence form of said video signal to produce a rearranged movement detection signal;

means for producing a prediction signal which is related to said rearranged movement detection signal;

means for calculating a difference between said video signal and said prediction signal to produce a prediction error signal; and means for compression-coding said prediction error signal.

* * * * *